No. 859,602. PATENTED JULY 9, 1907.
G. I. GREEN,
PNEUMATIC ATTACHMENT FOR SICKLES.
APPLICATION FILED SEPT. 8, 1905.

2 SHEETS—SHEET 1.

No. 859,602. PATENTED JULY 9, 1907.
G. I. GREEN.
PNEUMATIC ATTACHMENT FOR SICKLES.
APPLICATION FILED SEPT. 8, 1905.
2 SHEETS—SHEET 2.
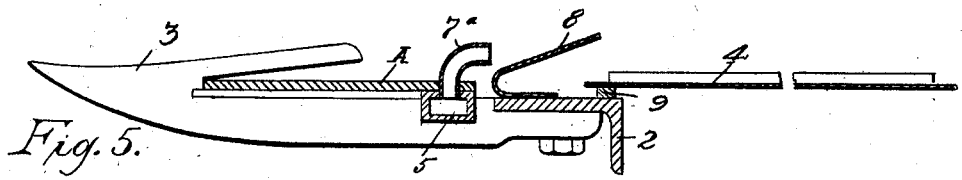
Fig. 5.
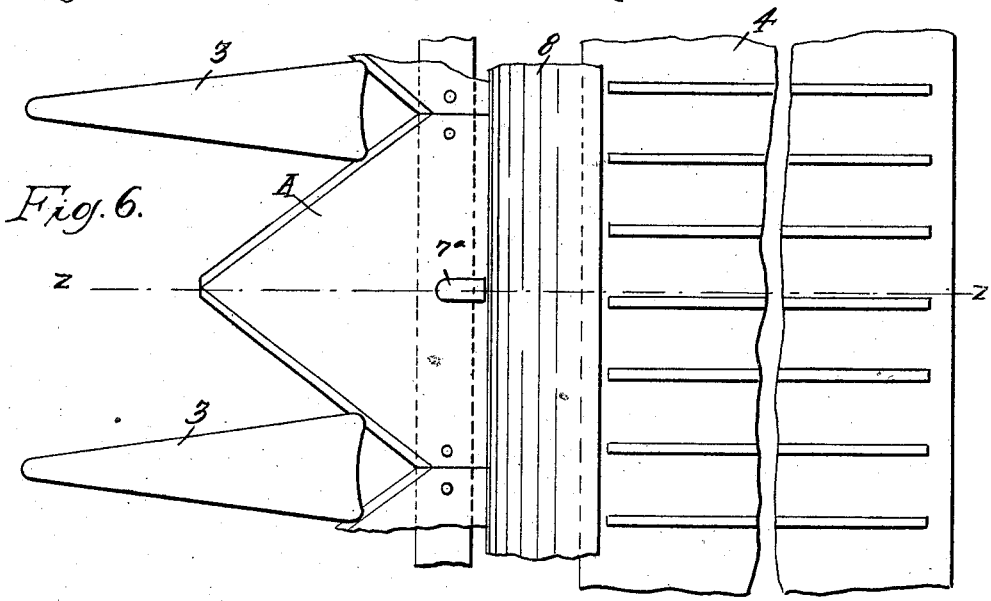
Fig. 6.
Fig. 7.
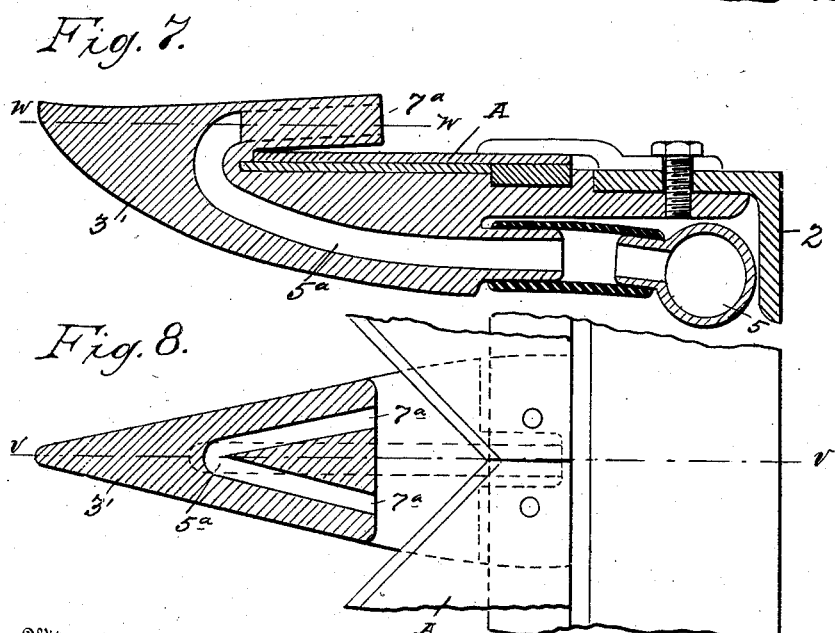
Fig. 8.
Witness
Chas. Larsen.
Inventor
George I. Green
By Geo. H. Strong. Attorney

UNITED STATES PATENT OFFICE.

GEORGE I. GREEN, OF DUNNIGAN, CALIFORNIA.

PNEUMATIC ATTACHMENT FOR SICKLES.

No. 859,602.  Specification of Letters Patent.  Patented July 9, 1907.

Application filed September 8, 1905. Serial No. 277,481.

*To all whom it may concern:*

Be it known that I, GEORGE IRVING GREEN, a citizen of the United States, residing at Dunnigan, in the county of Yolo and State of California, have invented new and useful Improvements in Pneumatic Attachments for Sickles, of which the following is a specification.

My invention relates to harvesting machinery, and especially to a pneumatic attachment for use in conjunction with the sickles, or knives, or sickle bar of a reaper, header, combined harvester, or the like, for the purpose of carrying or assisting in carrying the shorter heads of grain from the knives to the draper which delivers the cut grain into the machine.

Under the present methods of construction there is a constant and material waste caused by more or less of the grain falling from the sickle bar onto the ground after it is cut, especially when operating in short thin grain. The sickle bar must be lowered to cut this sort of grain and often the guards and knives stand at quite an incline. As the distance between the sickle and the draper is usually about five inches, there are a great many heads that fall short of the draper and the constant jolting of the machine causes them to slide down over the sickle and between the guards onto the ground to be lost. Various appliances, such as canvas strips on the rakes have been employed to sweep these short heads up the incline of the sickle bar onto the draper and to keep the heads from again shaking off the draper. These means are not satisfactory, and I purpose the employment of a jet or a series of jets of air proximate to the knives and guards and directed backward toward the draper so that any grain falling on the sickle bar will be blown back onto the draper and saved.

Figure 1:
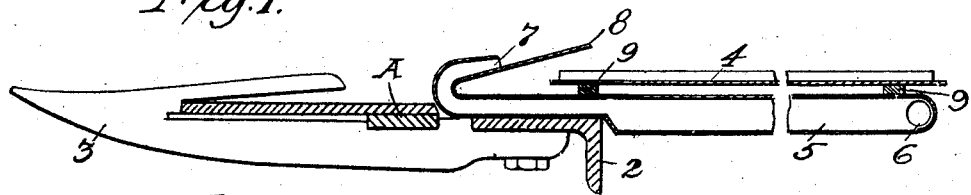
Figure 2:
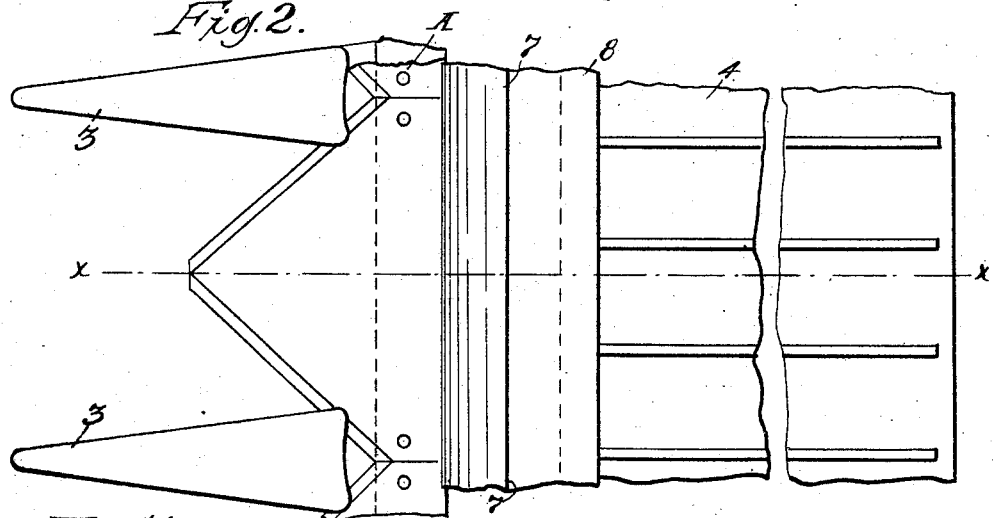
Figure 3:
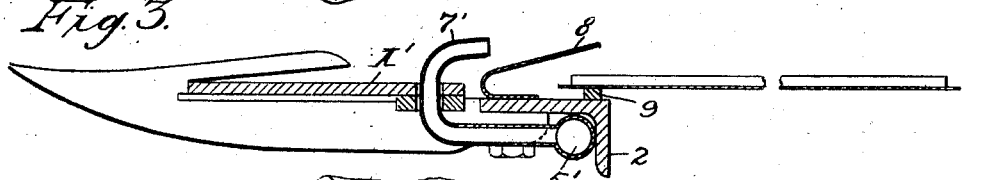
Figure 4:
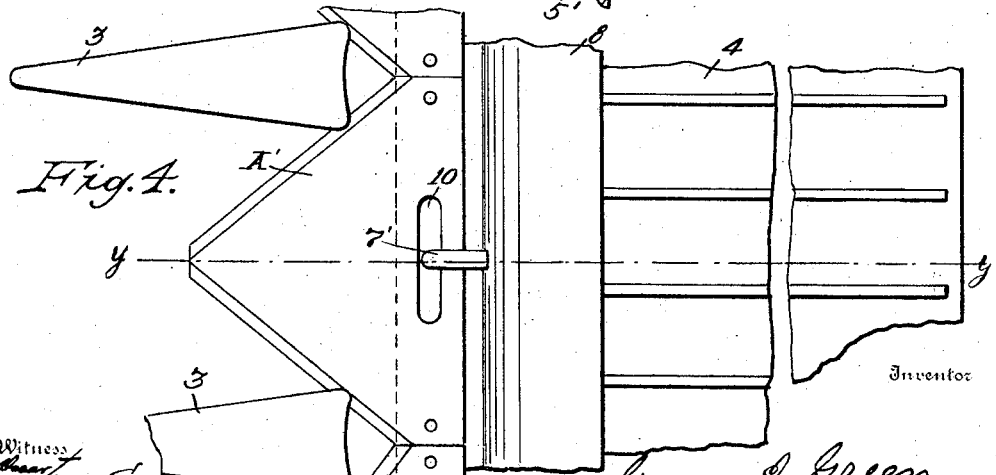

Having reference to the accompanying drawings, in which—Figure 1 is a vertical section on a line X—X of Fig. 2. Fig. 2 is a plan view of Fig. 1. Fig. 3 is a vertical section on a line Y—Y of Fig. 4. Fig. 4 is a plan view of Fig. 3. Fig. 5 is a vertical section on a line Z—Z of Fig. 6. Fig. 6 is a plan view of Fig. 5. Fig. 7 is a vertical section on a line V—V of Fig. 8. Fig. 8 is a horizontal section on a line W—W of Fig. 7.

In Figs. 1—2 A represents an ordinary sickle reciprocal in suitable guides on the stationary sickle bar 2.

3 are the usual guards or fingers, and 4 is the draper disposed behind the sickle and running transverse to the direction of travel of the machine and adapted to carry the cut grain into the machine.

5 is an air receiver or conduit fixed to a suitable support as the bar 2 and disposed between the planes of the draper and projecting out over the sickle A just behind the guards. This receiver or conduit is closed except for the inlet 6 and the narrow upturned and backwardly curved nozzle or nozzles 7. In the present instance I have shown a wide nozzle which extends for any suitable length along the sickle and is adapted when appropriate air pressure is supplied through inlet 6 to discharge a blast of air in a thin wide stream, backward in the direction of the draper. A backwardly and upwardly inclined plate or board 8 suitably fastened as to the receiver or sickle bar, is arranged behind the nozzle 7 and projects over the draper whose upper plane may be supported on suitable slides as 9 on the receiver.

The longer grain as it is cut by the knives will fall across the plate 8 onto the draper and will be saved independently of the air blast; but all short heads which fall short of the draper and would otherwise eventually shake or drop on to the ground, will be caught by the air blast from the nozzle or nozzles 7, and blown back onto the draper and saved.

In Figs. 3 & 4 is shown a modification in which an air conduit 5' extends the length of and underneath the sickle A'; the sickle is provided with the longitudinal slots 10, up through which project the backwardly curved nozzles 7'. These nozzles are carried by the conduit 5', and when the conduit is connected with a suitable source of air pressure supply, the air issuing from the nozzles 7', disposed preferably one behind each guard, the grain and the heads which fall onto the sickle will be blown back onto the draper. The conduit 5' is carried by the sickle support and the slots 10 provide for the proper reciprocation of the sickle without interference with the nozzle 7'.

In Figs. 5 & 6 a further modification embodying the same principle of a pneumatic aid in which the back of the sickle is made hollow and the nozzles 7$^a$ are carried directly by the sickle and move with it. This sickle has the usual pitman connections and is connected to the air pipe by a hose or like flexible connection.

In Figs. 7 & 8 is shown a further modification wherein I employ a hollow guard 3' provided with the necessary ducts by which a current or currents of air may be directed back from the knives and onto the draper. Air is admitted under suitable pressure into the port 5$^a$ from the underside of the guard and is discharged through the divergent ports 7$^a$ above the knives, which latter operate in the usual slots in the guards. The eduction ports 7$^a$ are preferably arranged divergent as shown so as to direct a current of air on each side of each guard and thereby sweep the entire grain supporting surface between the knives and draper.

It is possible that various other modifications in my invention may be made without departing from the principle thereof, and I do not wish to be understood as limiting myself to the specific constructions herein shown and described.

Having thus described my invention, what I claim and desire, to secure by Letters Patent is—

1. The combination of a sickle, a receiving surface behind the sickle to receive the cut-heads of grain, a rearwardly and upwardly inclined plate extending from the sickle and projecting over said receiving surface, and means for directing currents of air across the sickle and upon said inclined plate.

2. The combination of a sickle, a draper, a backwardly and upwardly inclined plate between the sickle and draper projecting over the latter, and means for delivering a jet of air from a point adjacent to the sickle and upon said inclined plate.

3. The combination with a sickle, a draper, an air receiver extending beneath the draper and having a nozzle portion projecting over the sickle and directing an air blast backward in the direction of the draper and a deflecting plate projecting over the draper and upon which plate the air blast is received.

In testimony whereof I have hereunto set my hand in presence of two subscribing witnesses.

GEORGE I. GREEN.

Witnesses:
 ROY FISHER,
 LEON H. FISH.